United States Patent [19]

Kataoka et al.

[11] Patent Number: 4,692,010

[45] Date of Patent: Sep. 8, 1987

[54] DEPTH-OF-FIELD PREVIEW APPARATUS FOR A SINGLE LENS REFLEX CAMERA

[75] Inventors: Akira Kataoka, Sennan; Yasuo Hawai, Higashiosaka; Hidehiko Fujii, Sakai; Tetsuro Oya, Osaka; Akihiko Fujino, Sakai, all of Japan

[73] Assignee: Minolta Camera Kabushiki Kaisha, Osaka, Japan

[21] Appl. No.: 883,641

[22] Filed: Jul. 9, 1986

[30] Foreign Application Priority Data

Jul. 10, 1985 [JP] Japan .................................. 60-152854

[51] Int. Cl.⁴ .............................................. G03B 9/02
[52] U.S. Cl. ...................................... 354/273; 354/453
[58] Field of Search ...................... 354/270, 271.1, 273, 354/272, 274, 289.1, 289.12, 453

[56] References Cited

U.S. PATENT DOCUMENTS

| | | | |
|---|---|---|---|
| 3,906,517 | 9/1975 | Nomura et al. | 354/272 X |
| 3,906,533 | 9/1975 | Mita | 354/272 |
| 4,322,144 | 3/1982 | Suzuki et al. | 354/453 |

Primary Examiner—L. T. Hix
Assistant Examiner—Brian W. Brown
Attorney, Agent, or Firm—Watson, Cole, Grindle & Watson

[57] ABSTRACT

A depth-of-field preview apparatus for a single lens reflex camera is provided with a display circuit responsive to a preview display signal generated by a control circuit with at least one of first and second switches being closed. The first switch is closed when an operating member is operated to an operated position and opened when the operating member is released to return to a non-operated position under a spring bias. In response to the closure of the first switch the control circuit generates the preview display signal and an electromagnetic device causes a diaphragm stop-down mechanism to stop-down a diaphragm. When the diaphragm is stopped-down to a preset aperture size, another electromagnetic device stops the diaphragm stop-down mechanism to set the diaphragm to the preset aperture size and at the same time closes the second switch. With the second switch being closed the control circuit continues to generate the preview display signal independently of the condition of the first switch, so that a preview display by the display circuit does not cease even if the operating member is released and accordingly the first switch is opened.

3 Claims, 10 Drawing Figures

DEPTH-OF-FIELD PREVIEW APPARATUS FOR A SINGLE LENS REFLEX CAMERA

BACKGROUND OF THE INVENTION

1. Field of the Invention

The present invention relates to a depth-of-field preview apparatus provided in a single lens reflex camera.

2. Description of the Prior Art

A single lens reflex camera is known and having a so-called full aperture light measurement system in which a diaphragm stop-down system is held at a full aperture setting position to maximize the brightness of a view-finder image to thereby facilitate focusing, and at the same time the brightness of an object is measured by a photometer on the camera body side and through the full aperture to determine an optimum aperture value, whereas at the time of photographing, the diaphragm stop-down system stops-down the diaphragm to the optimum aperture.

A camera system having such a diaphragm stop-down system usually incorporates therein a depth-of-field preview apparatus for enabling a camera operator to preview the depth of field, etc. through the field of view in the view-finder prior to photographing. By manually operating an operating portion of such a depth-of-field preview apparatus, a switch is changed over to its preview condition for causing an electromagnetic means to release the diaphragm stop-down system so that it can stop-down the diaphragm to a reduced aperture size, for example, a preset aperture size.

The diaphragm stop-down system if so arranged as to move back to an open condition in response to a releasing of the operating portion, that is when camera operator's finger is removed the aforesaid operating portion. This is very inconvenient for the camera operator since the operator must continue to manipulate the operating portion while he or she wishes to observe the depth-of-field.

For the purpose of overcoming the above inconvenience, there may be provided means for locking the diaphragm stop-down mechanism at its stopped down position.

Furthermore, for the purpose of informing the camera operator that the camera is under the preview condition, there may be also provided a display member which provides a display in response to the change-over of the above mentioned switch to the preview condition.

However, with a camera including the above mentioned display member and the diaphragm stop-down system locking means, the display is turned off when the camera operator releases the operating portion, while the camera is maintained in the preview condition. Therefore, the camera operator may misunderstand that the camera is not in the preview condition after a releasing of the operating portion.

SUMMARY OF THE INVENTION

It is an object of the present invention to provide a depth-of-field preview apparatus for a single lens reflex camera, capable of correctly informing a camera operator that the camera is in a preview condition or not.

In order to achieve the above object, the depth-of-field preview apparatus of the present invention is provided with an operating member manually movable between an operated position and a non-operated position and urged toward the non-operated position. A first switch is changed over from a first condition to a second condition in response to the movement of the operating member to its operated position. Also provided are for actuating the diaphragm stop-down mechanism in response to the change-over of the first switch to its second condition, means for stopping the diaphragm stop-down mechanism to set the diaphragm to a reduced aperture size, a second switch changed over from a first condition to a second condition with the stopping means stopping the diaphragm stop-down mechanism, a control circuit for producing a preview display signal with at least one of the aforementioned switches being in the second position and a display means responsive to the display signal for displaying that the camera is in the preview condition.

When the operating member is manually operated to the operated position, the first switch is changed over from the first condition to the second condition, whereupon the operation of the diaphragm stop-down mechanism is started to stop down the diaphragm. At the same time, the preview display is started. Thereafter, the operation of the diaphragm stop-down mechanism is stopped by the stopping means so that the diaphragm is set to a reduced aperture size, for example, a preset aperture size. The stopping operation of the stopping means causes the second switch to be changed over from the first condition to the second condition so that the control circuit can maintain the preview display. Accordingly, even when the operating portion is released after having been operated to the operated position, it is possible to display the depth-of-field preview condition correctly.

The above and other objects, features and advantages of the present invention will become more apparent from the following description of a preferred embodiment of the invention taken in conjunction with the accompanying drawings.

DESCRIPTION OF PREFERRED EMBODIMENT

Figure 1:
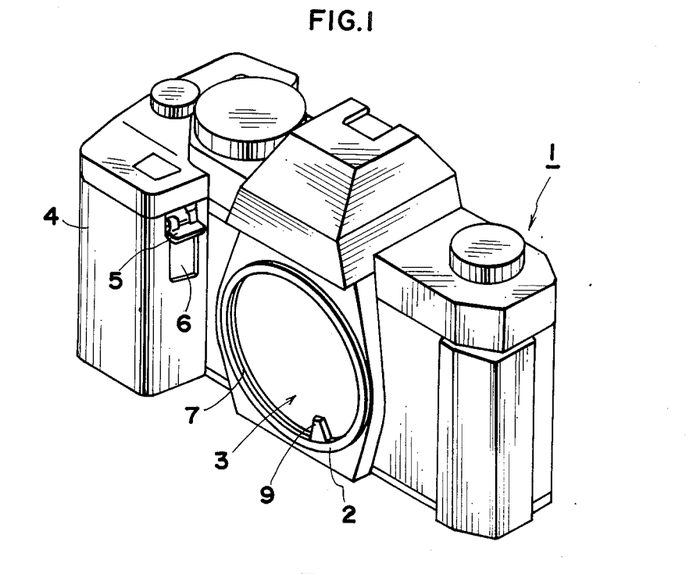
FIG. 1 is a schematic perspective view showing a body of a single lens reflex camera which houses therein a depth-of-field preview apparatus embodying the present invention.

In FIG. 1, a lens mounting seat plate 2 is fixed to the front of a camera body 1. A hand grip portion 4 which also serves as a battery case projects from the front face of the camera body 1 on the left side of an opening portion 3 surrounded by the seat plate 2. In a side face of the hand grip portion 4 opposed to the opening 3 there is formed an operation window 6 on which a preview button (preview operating member) 5 is mounted as shown.

On the rear side of the seat plate 3, a preset ring 7 which surrounds the opening portion 3 is mounted rotatably in a predetermined phase angle range. The preset ring 7 is interlocked with a mechanism of a stop-down system and it rotates about the center of the opening portion 3 in accordance with the operation of the stop-down system, causing a stop-down system on the lens side to be operated through an automatic stop-down lever 9 fixed to the inner face thereof.

Figure 2:
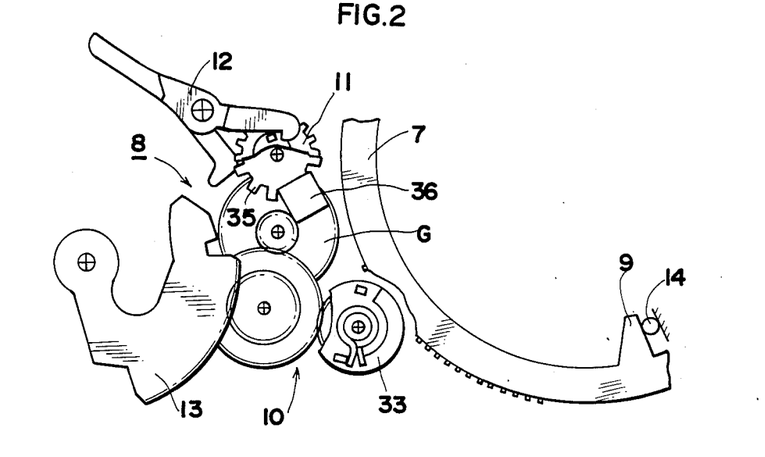
FIG. 2 is a front view showing a principal portion of a stop-down system in the camera body.
Figure 3:
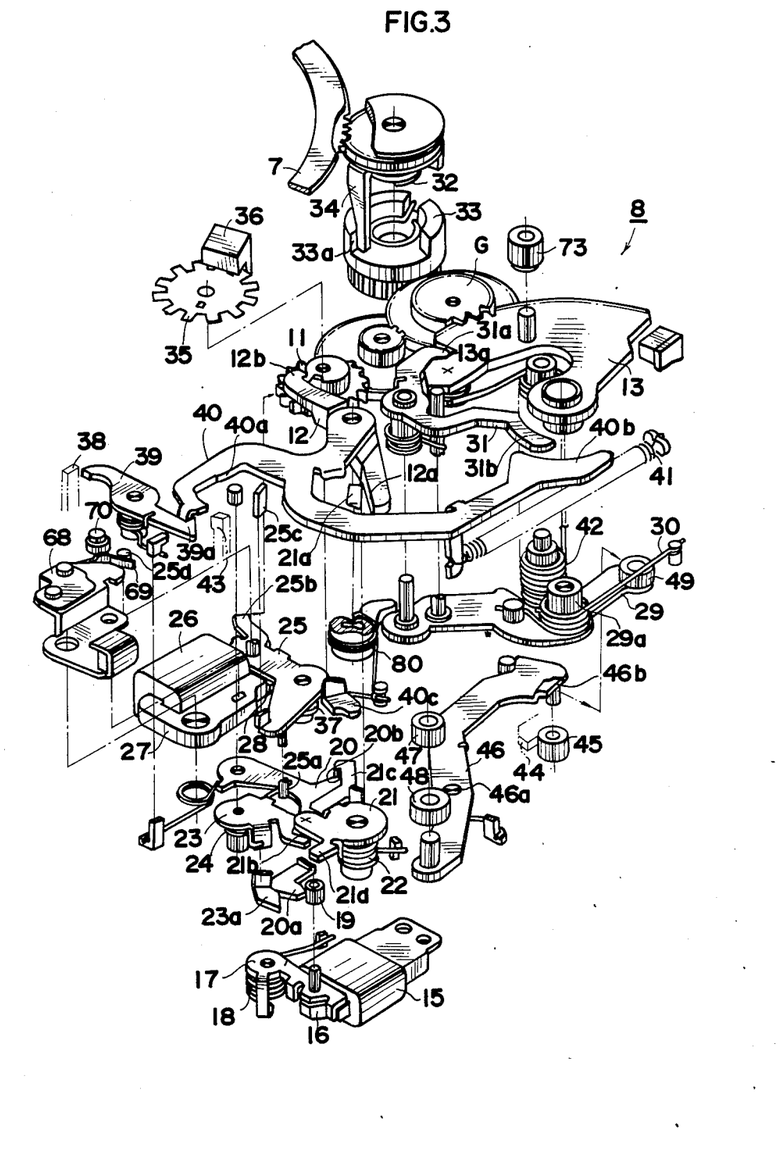
FIG. 3 is an exploded perspective view of the stop-down system.
Figure 4:
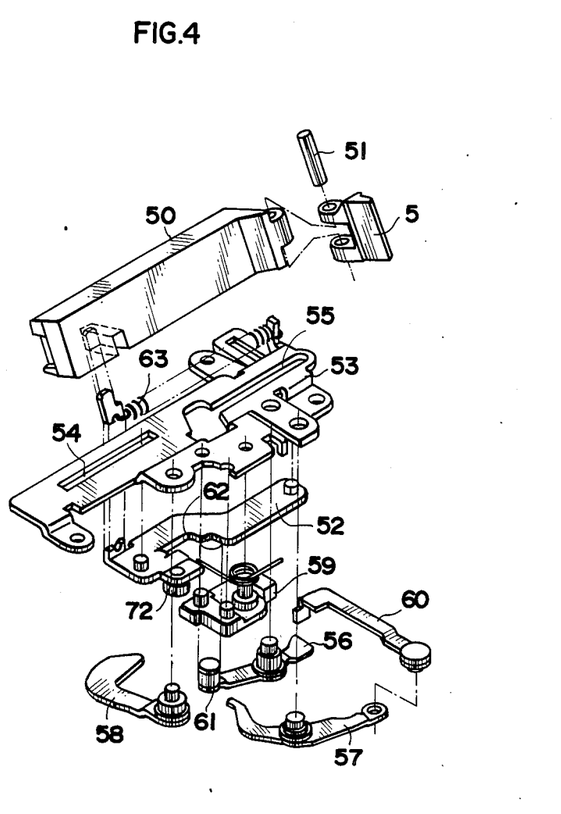
FIG. 4 is an exploded perspective view of a principal portion of a preview system used in the invention.

In FIGS. 2 and 3 (in FIG. 3 the preset ring 7 is disposed at the top to make it easy to see), there is provided a stop-down system 8 on the side of the camera body 1. The construction and operation of the stop-down system 8 will be explained below with reference to FIGS. 2 and 3.

In a completely loaded state of the stop-down system 8, a drive system 10 for the preset ring 7 is retained by engagement of a ratchet wheel 11 and a ratchet wheel retaining lever 12. In this retained state the drive system 10 is urged in a stop-down direction by means of a spring through a sector gear 13.

Then, when the stop-down system 8 is released and the ratchet wheel 11 is disengaged from the ratchet wheel retaining lever 12, the drive system 10 starts operating under the action of a stop-down spring (not shown), whereupon the preset ring 7 is turned in a clockwise direction. As a result, an automatic stop-down lever 9 on the side of the camera body 1, which lever has restricted a lens-side automatic stop-down lever 14 toward an opening side, turns in the stop-down direction, the automatic stop-down lever 14 being urged to the stop-down side by means of a spring.

Therefore, when the drive system 10 is stopped in any stop-down position by an aperture control system (not shown) and the automatic stop-down lever 9 on the side of the camera body 1 undergoes a corresponding phase displacement, the automatic stop-down lever 14 on the lens side responds thereto and diaphragm blades (not shown) interlocked with the automatic stop-down lever 14 operates in a direction of reducing the amount of transmitted light to determine an aperture diameter.

The release operation of the stop-down system 8 on the side of the camera body 1 will now be explained mainly on the basis of FIG. 3. First, when a release button (not shown) is operated, a stop-down release magnet 15 is energized, whereupon a movable member 16 which has been attracted by the magnet 15 as a combination magnet is released. As a result, a movable member lever 17 is turned in a clockwise direction by virtue of a separating spring, and with this turning motion of the movable member lever 17 a collar 19 mounted on the lever 17 pushes a cam face 20a of a release retaining lever 20, causing the lever 20 to turn in a clockwise direction, so that a retaining portion 20b thereof is disengaged from a release trigger lever 21. As a result, the release trigger lever 21 turns clockwise under the action of a spring 22. At the same time, a lever portion 21a of the release trigger lever 21 pushes a cam face 12a of the ratchet wheel retaining lever 12 to turn the latter in a counterclockwise direction.

A forkshaped portion is formed in a magnet pushing lever 23 for holding a pin portion 21b of the release trigger lever 21 therein, so with the turning motion of the lever 21 the magnet pushing lever 23 is turned counterclockwise and its lever portion 23a pushes back the collar 19, whereby the movable member 16 is pushed against the stop-down release magnet 15 against the biasing force of the separating spring 18 and is again attracted thereby.

Further, a magnet pushing spring 24 is suspended between a pin portion 25a of a stop-down stopping pawl 25 and the magnet pushing lever 23, and in a loaded state the spring 24 pushes the pawl 25 against an iron core 27 of a stop-down stopping magnet 26 through a movable member 28.

As the magnet pushing lever 23 turns, the magnet pushing spring 24 is relaxed and the stop-down stopping pawl 25 is thereby released from the spring force. But, almost simultaneously with the energization of the stop-down release magnet 15 the stop-down stopping magnet 26 is also energized, so the movable member 28 thereof is attracted by the iron core 27 and consequently the stopping member pawl 25 is held in the same position. A retaining pin 25d is projecting from the pawl 25 and it is in abutment with a later-described second switch spring 69.

A diaphragm urging lever 29 is urged in a stop-down direction (counterclockwise) about a bearing 29a thereof by means of a drive spring 30. Therefore, a pulling hook 31 pivotally supported on the lever 29 is also urged counterclockwise about the bearing 29a by means of the drive spring 30. Since a retaining portion 31a of the hook 31 is engaged with a retaining slot 13a of the sector gear 13, the sector gear 13 is also urged counterclockwise by the drive spring 30.

When a release signal is fed to the stop-down system 8 to turn the release trigger lever 21 clockwise, the lever portion 21a of the lever 21 pushes the cam face 12a of the ratchet wheel retaining lever 12 to turn the latter counterclockwise, thereby allowing the retaining portion 12b thereof to be disengaged from the ratchet wheel 11. As a result, the drive system 10 starts operating as previously described.

In this case, when the stop-down system 8 is in a loaded state, an coupling spring 32 acts to push the lens-side automatic stop-down lever 14 toward the open side, and at the beginning of operation of the drive system 10 this drive system is driven by virtue of both the coupling spring 32 and the drive spring 30, but the preset ring 7 itself is not operated. With the operation of the drive system 10, an abutting face 33a of a transfer gear 33 comes into abutment with a transfer lever 34, resulting in that the coupling spring 32 no longer functions. At this time, the drive system 10 operates under the action of only the drive spring 30 together with the preset ring 7 through the transfer lever 34 to allow the lens-side stop-down system to stop-down.

The ratchet wheel 11 is disposed at the last stage of a speed increasing gear train G of the drive system 10, and a code plate 35 is attached thereto. The code plate 35 is adapted to rotate together with the ratchet wheel 11 and a rotational phase angle thereof is read by a photo coupler 36 to monitor the operating state of the drive system 10. Pulses obtained by the photo coupler 36 are counted in an operation system. In the program mode or the shutter speed priority automatic exposure control mode, a stop-down stopping signal is issued at the number of pulses corresponding to an aperture value calculated in advance by a photometric system and operation system, whereby the stop-down stopping magnet 26 is deenergized. In the aperture priority automatic exposure control mode or the manual mode, the stop-down stopping magnet 26 is deenergized when the number of pulses corresponding to an aperture value set by a setting device (not shown) is reached.

Once the magnet 26 is deenergized, the movable member 28 attracted by the iron core 27 of the magnet moves away from the core 27 under the action of a stop-down stopping pawl driving spring 37, so that the stop-down stopping pawl 25 turns clockwise and its pawl portion 25b is brought into engagement with the ratchet wheel 11 to stop the operation of the stop-down system 8. At the same time, the lens-side automatic stop-down lever 14 which has been operating in the stop-down direction is also stopped, thus affording a desired aperture value. In this way the release operation of the stop-down system 8 is performed.

The reset and loading operations of the stop-down system 8 will now be explained. Upon completion of exposure of the camera body 1, a reset lever 38 operates to turn a return retaining lever 39 in a clockwise direction to thereby disengage a retaining portion 39a of the lever 39 from a return trigger lever 40. As a result, the lever 40 is turned counterclockwise by virtue of a drive spring 41, and with this turning motion, a cam portion 40a of the return trigger lever 40 pushes a lever portion 25c of the stop-down stopping pawl 25 to disengage the pawl portion 25b of the stopping pawl 25 from the ratchet wheel 11. Then, as the return trigger lever 40 further turns counterclockwise, one free end portion 40b thereof pushes a lever portion 31b of the pulling hook 31 to turn the hook 31 counterclockwise, while disengaging the retaining portion 31a on an opposite side from the retaining slot 13a of the sector gear 13.

A return spring 42 is suspended between the sector gear 13 and the diaphragm urging lever 29 in a direction of expansion of both 13 and 29. Therefore, upon disengagement of the retaining portion 31a of the pulling hook 31 from the retaining slot 13a of the sector gear 13, the diaphragm urging lever 29 turns counterclockwise until abutment with a stopper member (not shown) under the action of the return spring 42. During this period, the sector gear 13 turns clockwise to push the lens-side automatic stop-down lever 14 back to its open position through the preset ring 7 thereby returning the lens barrel side stop-down system to its open condition. At the same time, the return trigger lever 40 turns counterclockwise to push a winding stop release lever 43, whereby the winding stop (not shown) is released, now ready for the next winding. In the above-described way the reset operation is performed.

Next, when winding is started by a winding lever (not shown) or any other suitable means, a charge lever 44 starts operating, whereby a stop-down loading lever 46 is turned clockwise about a pivot shaft 46a thereof. As a result, a first loading roller 47 pushes a lever portion 40c of the return trigger lever 40, thereby causing the lever 40 to turn clockwise until retained by the retaining portion 39a of the return retaining lever 39. A second loading roller 48 pushes a cam face 21c of the release trigger lever 21 to let the lever 21 turn counterclockwise against the spring 22 until retained by the retaining portion 20b of the release retaining lever 20. At this time, the magnet pushing lever 23 also turns clockwise to interlock with the pin portion 21b of the release trigger level 21, so that the lever 23a which has pushed the collar 19 is disengaged from the collar, now permitting the movable piece lever 17 to move away from its present position. Further, as the magnet pushing lever 23 turns, the pin portion 25a of the stop-down stopping pawl 25 is pushed by the magnet pushing spring 24, whereby the movably piece 28 is pushed against the iron core 27 of the stop-down stopping magnet 26.

An end face 46b of the loading lever 46 pushes a roller 49 mounted on the diaphragm urging lever 29, thereby causing the lever 29 to turn clockwise against the drive spring 30 and return spring 42. With this turning motion of the lever 29, the retaining portion 31a of the pulling hook 31 comes into engagement with the retaining slot 13a of the sector gear 13 to turn the gear 13 clockwise. During this turning motion of the sector gear 13, the lens-side automatic stop-down lever 14 is stopped in its open position, so it can no longer turn. Consequently, the preset ring 7 and the transfer lever 34 are not rotated. The transfer gear 33 turns clockwise against the biasing force of the coupling spring 32, so that the abutting face 33a of the transfer gear 33 and the transfer lever 34 are disengaged from each other. In this state, the retaining portion 12b of the ratchet wheel retaining lever 12 comes into engagement with the ratchet wheel 11 and thus the loading operation of the stop-down system 8 is completed. In this way there is performed the loading operation of the stop-down system 8.

In FIGS. 4 to 8 (in FIG. 4 the preview button 5 is disposed at the top to make it easy to see), the preview button 5 is connected to an upper end of a slider member 50 pivotably vertically or in the arrowed direction in the figure through a hinge pin 51. The slider member 50 is mounted on the back side of the operation window 6 (see FIG. 1) vertically slidably along the aforesaid back side. To a lower end portion of the slider 50 is interlockingly connected an operating plate 52. Between the operating plate 52 and the slider 50 is disposed a base plate 53 which is guided slidingly vertically or in the arrowed direction in the figure along slide guide holes 54 and 55 formed in the base plate 53. On the base plate 53 there are pivotably mounted a release lever 56, a set lever 57 and a loading lever 58, and a first switch holder 59 is fixed to the base plate. Further, a set plate 60 is connected pivotably to one end portion of the set lever 57.

Figure 5:
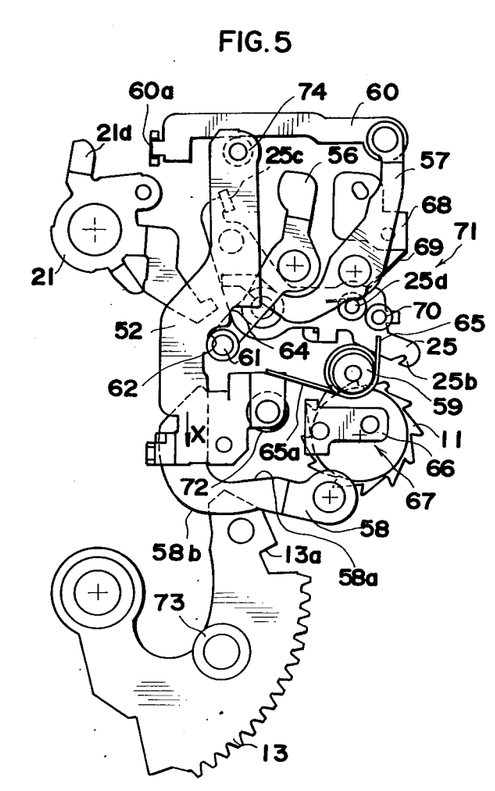
FIGS. 5 to 8 are front elevational views showing operations of the preview operation system successively in their respective order of operation.

The operation of this preview operation system will now be explained on the basis of FIGS. 5 to 8. FIG. 5 shows a set state of the preview operation system. In the state shown therein, a roller 61 mounted on one end of the release lever 56 is retained by a lower engaging recess 62 formed in the operating plate 52. When the preview button 5 is depressed, the operating plate 52 is slid downward in the direction of arrow X against the biasing force of a spring 63 (see FIG. 4). In this case, the release lever 56 is provided with a spring which urges the roller 61 against one side face of the operation plate 52, so the roller 61 rolls in sliding contact with the one side face of the operating plate 52 and is retained by the lower engaging recess 62.

Figure 6:
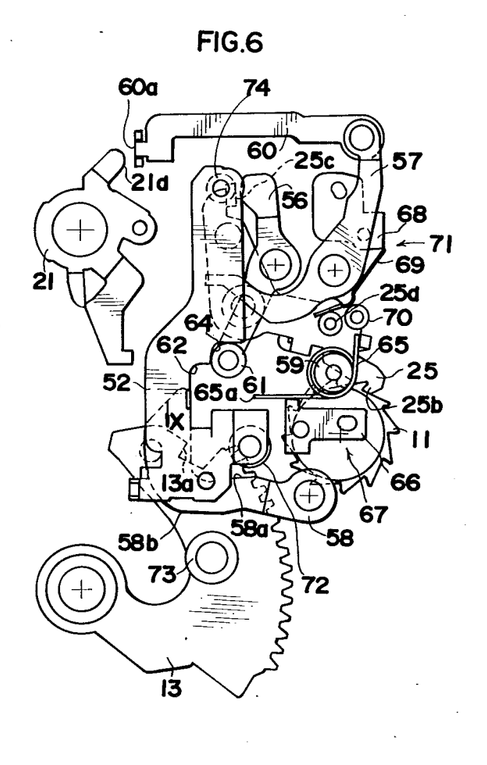

Then, when the preview button 5 is further depressed by one step, the operating plate 52 slides further downwards, so that the roller 61 gets over the lower engaging recess 62 and comes into engagement with an upper engaging recess 64 to stop the operation plate 52. FIG. 6 shows this engaged state. A first switch spring 65 attached to the first switch holder 59 has an operating end 65a. With the downward movement of the operating plate 52, the operating end 65a which has been engaged with the operating plate 52 comes into abutment with a first switch contact member 66 which is fixed to the first switch holder 59.

When the operating end 65a of the first switch spring 65 abuts the first switch contact piece 66 in the above manner, a first preview switch 67 turns ON and a preview signal is fed to the stop-down system on the camera body side.

A display portion 77 which displays a preview state is provided in the camera body so that it turns ON upon issuance of a preview signal.

Upon receipt of the preview signal, the stop-down system 8 on the camera body side operates as per the foregoing release operation of the same system.

More specifically, when the preview signal is fed to the stop-down system 8 on the camera body side, the stop-down stopping pawl 25 turns clockwise and the pawl portion 25b comes into engagement with the ratchet wheel 11. With this motion of the pawl 25, the retaining pin 25d projecting from the pawl 25 moves away from a second switch spring 69 of a second switch contact member 68 to release the second switch spring 69, so that the spring 69 abuts a second switch contact 70 and a second preview switch 71 turns ON.

The second preview switch 71 is provided for diaphragm that the stop-down system 8 is in the preview operation state, so even if the preview button 5 is released after turning ON of the second preview switch 71 and the operating plate 52 is returned to its original state by virtue of the spring 63 thereby turning OFF the first preview switch 67, the display is maintained to display that the system is under the preview state.

The returning process of the preview operation system will now be explained. As the preview button 5 is further depressed downward to further move the operating plate 52 in the direction of arrow X, the roller 61 gets over the upper engaging recess 64 while rolling in sliding contact with one side face of the operating plate 52, so that the release lever 56 turns counterclockwise, pushes the lever portion 25c of the stop-down stopping pawl 25 and causes the pawl 25 to turn counterclockwise to release the pawl 25 from the ratchet wheel 11. At the same time, the engaging pin 25d pushes the second switch spring 69 to turn OFF the second preview switch 71. At this time, a loading roller 72 attached to a lower end of the operating plate 52 pushes a first cam face 58a of the loading lever 58 to turn the lever 58 counterclockwise, whereupon a second cam face 58b of the lever 58 pushes a return roller 73 mounted on the sector gear 13 to turn the latter clockwise. As a result, the preset ring rotates in the opening direction through the drive system 10 and the automatic stop-down lever 14 on the lens side is pushed back toward the open side.

As the operating plate 52 is further pushed from this state, a set roller 74 mounted on an upper end of the operating plate 52 pushes a lever portion 57a of the set lever 57 to turn the latter counterclockwise. As a result, the set plate 60 moves in the direction of arrow Y and a lever portion 60a thereof pushes a cam face 21d of the release trigger lever 21 and turns the lever 21 counterclockwise. Since this counterclockwise motion of the lever 21 is the same as that in the loading operation of the stop-down system 8, the lever 21 is retained by the retaining portion 20b of the release retaining lever 20 and the aperture control system assumes a set state.

The loading roller 72 rotates the sector gear 13 up to a position corresponding to an overload condition beyond the open position through the loading lever 58, so that the ratchet wheel retaining lever 12 is brought into engagement with the ratchet wheel 11 by means of a spring 80, the drive system 10 also assumes a set state and the stop-down system 8 on the camera body side reverts to the original set end state. The following description is now provided about the control of operation of each switch associated with preview.

Figure 9:
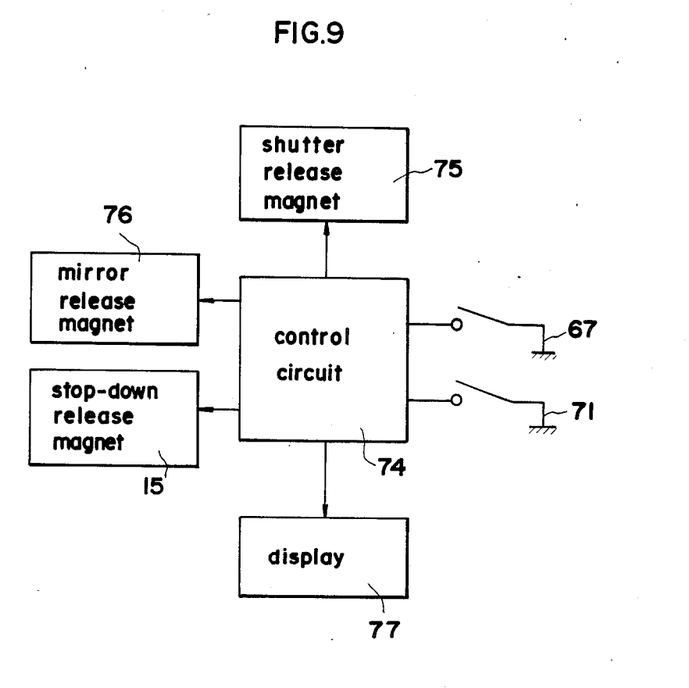
FIG. 9 is a block circuit diagram showing the interconnections between the first and second preview switches and a control circuit.

In FIG. 9, both preview switches 67 and 71 are connected to a control circuit 74, and ON and OFF signals provided when the switches 67 and 71 turn ON and OFF respectively are fed to a controlling microcomputer in the control circuit 74. This microcomputer performs decision operations such as start and end of preview in accordance with the ON and OFF signals. In response to the results of the decision operations the controlling microcomputer controls the energization of the stop-down release magnet 15, mirror release magnet 76 and shutter release magnet 75 and also controls the operation of a preview display circuit provided in the camera body.

Figure 10:
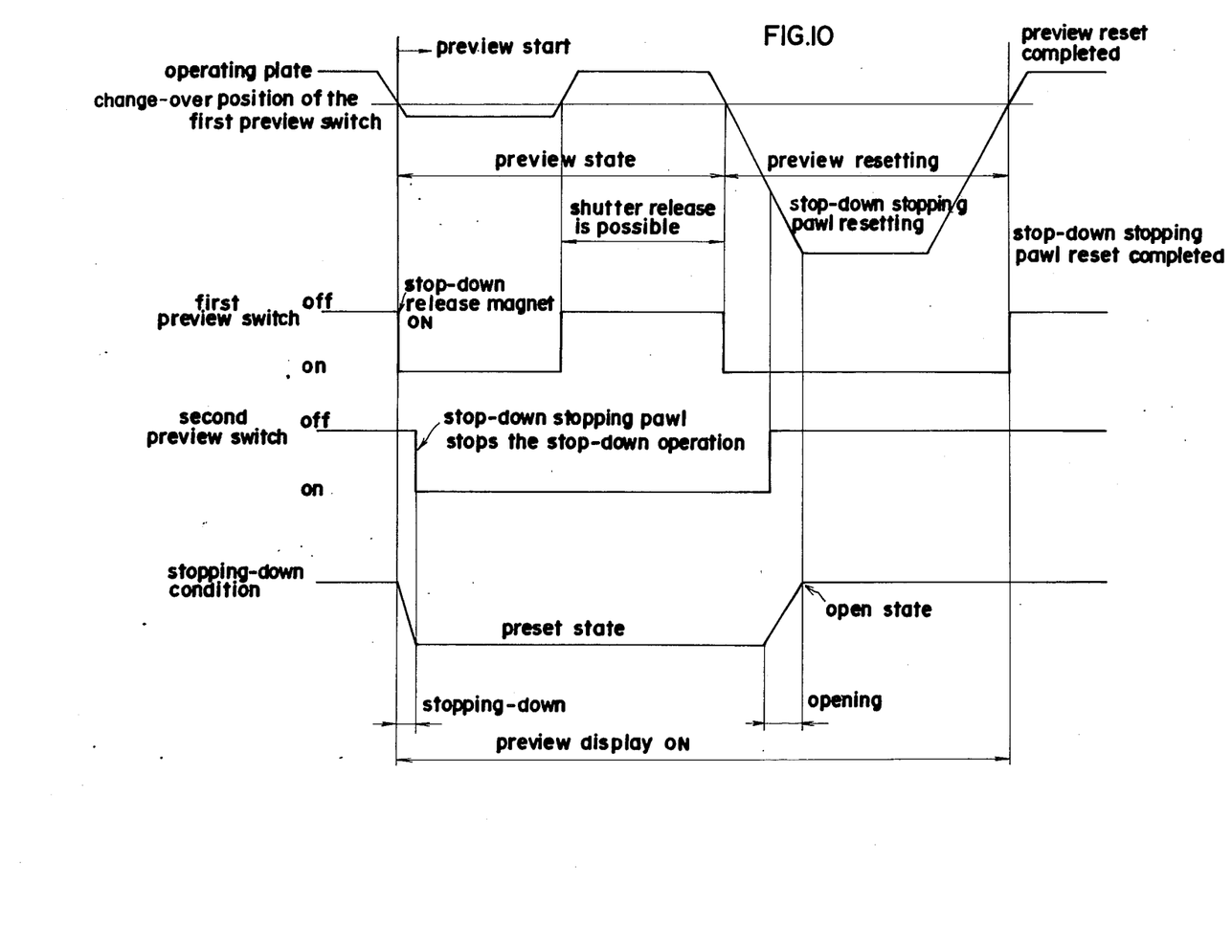
FIG. 10 is a time chart showing the operations of the first and second preview switches associated with depression of a preview button as well as an aperture diaphragm stopping-down condition in a lens.

In FIG. 10, when the operating plate 52 is pushed to first turn ON the first preview switch 67, the controlling microcomputer judges that the preview state is ON, and turns ON the stop-down release magnet 15 to start stop-down operation.

Next, when the lens aperture value reaches a preset value, the stop-down stopping pawl 25 stops the stop-down operation and the second preview switch 71 is turned ON by the pawl 25. The controlling microcomputer is programmed as follows. When the second preview switch 71 turns ON after turning ON of the first preview switch 67, the controlling microcomputer determines that the preview state of the stop-down system 8 is continued, while when the preview switches 67 and 71 are not turned OFF, the microcomputer determines that the preview state is maintained. Therefore, even when the preview button 5 is released and the first preview switch 67 is turned OFF, the second preview switch 71 is held ON, so the preview display is maintained.

Where an actual photographing operation is to be started from the preview state, if the shutter release is inhibited in the preview state, it will not be in time to take a photograph.

Such an inconvenience can be avoided and a photograph of an appropriate exposure can be done from the preview state by utilization of the above-described controlling microcomputer.

Figure 7:
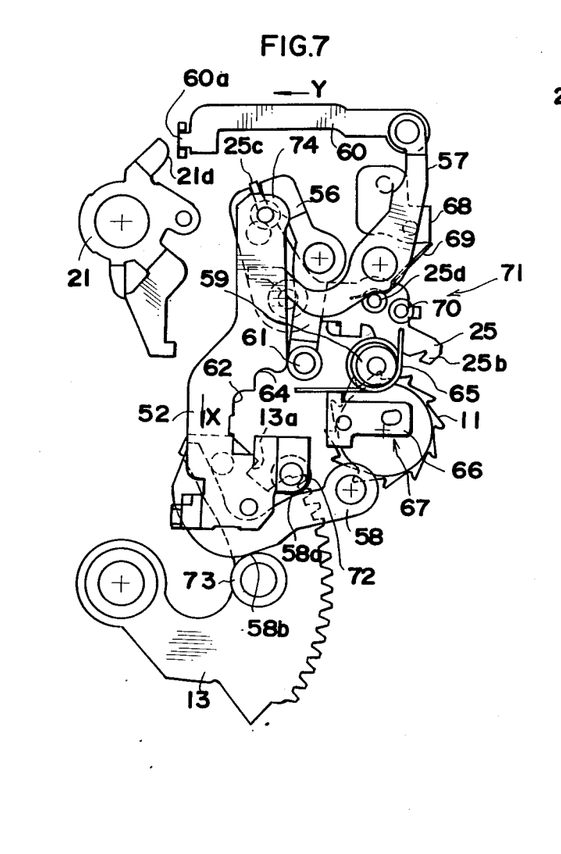
Figure 8:
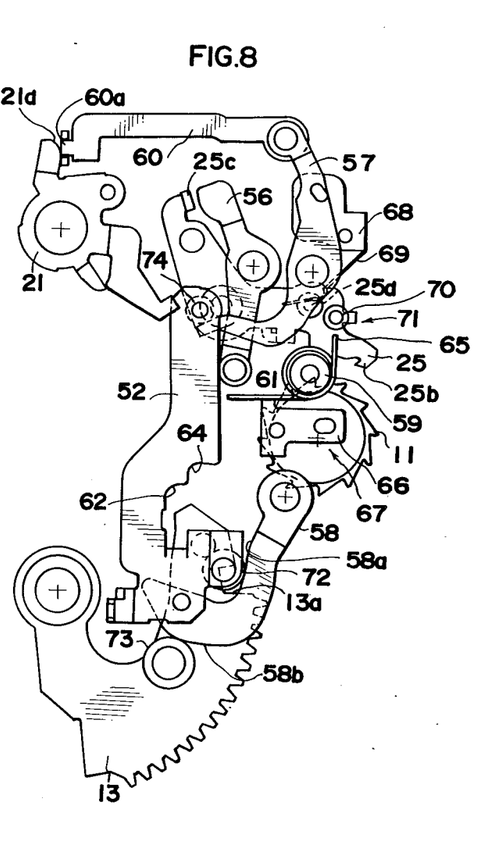

More particularly, as shown in FIGS. 7 and 8, if shutter release is performed during a preview setting or resetting operation, it will be impossible to effect photographing of an appropriate exposure because the stop-down system 8 on the lens side has not reached the preset aperture value. Therefore, during preview setting or resetting operation, namely, when the preview button 5 is in an operated state and the first preview switch 67 is ON, the shutter release magnet or the mirror release magnet is kept inoperable through the control circuit 74 to inhibit shutter release. However, when the first preview switch 67 is OFF, namely, in a stopped down state to the preset aperture value, the shutter release magnet or the mirror release magnet is kept operable.

In this case, if the preview button 5 is again operated from the preview state to the reset preview state, the first preview switch 67 will turn ON. Thereafter, when the preview button 5 is further pushed the second preview switch is turned OFF as previously noted, while the first preview switch 67 is ON, so the camera continues to make a preview display. In this state, when the preview button 5 is released, the first preview switch 67 is turned OFF, the controlling microcomputer determines that the preview is over, and the preview display of the camera turns OFF.

What is claimed is:

1. In a single lens reflex camera including an objective lens system, a diaphragm in said objective lens system and a diaphragm stop-down mechanism for stopping-down said diaphragm, a depth-of-field preview apparatus comprising:

an operating member mounted in said camera to be manually moved between an operated position and a non-operated position, and urged in a direction from said operated to said non-operated positions;

a first switch adapted to be changed over from a first condition to a second condition in response to the movement of said operating member to said operated position and from said second condition to said first condition in response to the movement of said operating member to said non-operated position;

means for actuating said diaphragm stop-down mechanism in repsonse to said change-over of said first switch from said first to said second condition;

means for stopping said diaphragm stop-down mechanism to set said diaphragm to a reduced aperture size;

a second switch adapted to be changed over from a first condition to a second condition with said diaphragm stop-down mechanism stopped by said stopping means;

a control circuit for producing a preview display signal with at least one of said first and second switches being in said second position; and a display means for displaying that the camera is in the preview condition, in response to said preview display signal.

2. A depth-of-field preview apparatus as stated in claim 1, wherein said operating member is movable further to a second operated position through said operated position for restoring said diaphragm stop-down mechanism.

3. A depth-of-field preview apparatus as stated in claim 1, wherein said camera further comprises a hand grip portion at one lateral side thereof and said operating member is slidable in said hand grip portion in a vertical direction.

* * * * *